United States Patent [19]
Weder

[11] Patent Number: 6,151,829
[45] Date of Patent: Nov. 28, 2000

[54] METHOD FOR PROVIDING A DECORATIVE COVER FOR A FLORAL GROUPING

[75] Inventor: Donald E. Weder, Highland, Ill.

[73] Assignee: Southpac Trust International, Inc.

[*] Notice: This patent is subject to a terminal disclaimer.

[21] Appl. No.: 09/522,675

[22] Filed: Mar. 10, 2000

Related U.S. Application Data

[63] Continuation of application No. 09/408,599, Sep. 30, 1999, Pat. No. 6,055,772, which is a continuation of application No. 09/295,715, Apr. 21, 1999, Pat. No. 6,029,400, which is a continuation of application No. 09/050,437, Mar. 30, 1998.

[51] Int. Cl.⁷ .............................. A01B 79/00; A01C 1/00; A01N 1/00; A41G 3/00; B65B 61/00
[52] U.S. Cl. .................................. 47/58.1; 47/72; 53/410; 428/15
[58] Field of Search ........................ 47/72, 58; 428/9–12, 428/15, 16, 43, 34.1; 446/148; 53/399, 397, 410

[56] References Cited

U.S. PATENT DOCUMENTS

| | | | |
|---|---|---|---|
| Re. 16,347 | 5/1926 | Bliss | 256/27 |
| 787,178 | 4/1905 | Hopkins | 206/767 |
| 931,631 | 8/1909 | Milhado | 24/17 A |
| 1,520,647 | 12/1924 | Hennegan | 47/72 |
| 1,525,015 | 2/1925 | Weeks | 53/449 |
| 1,689,155 | 10/1928 | Rittenhouse | 206/457 |
| 1,821,564 | 10/1931 | Muller | 53/399 |
| 1,868,853 | 7/1932 | Sievers | 47/72 |
| 1,873,666 | 8/1932 | Roy | 47/41.01 |
| 1,890,314 | 12/1932 | Crane | 40/306 |
| 1,958,517 | 5/1934 | Low | 40/7 |
| 1,970,370 | 8/1934 | Foser | 47/41 |
| 2,111,129 | 3/1938 | Rittenhouse | 47/72 |
| 2,146,173 | 2/1939 | Cooper | 217/124 |
| 2,217,454 | 10/1940 | Pfeiffer | 47/41.01 |
| 2,303,296 | 11/1942 | Avery | 229/53 |
| 2,340,373 | 2/1944 | Gardner | 47/37 |
| 2,420,045 | 5/1947 | Krug | 40/2 |
| 2,468,695 | 4/1949 | Wallace et al. | 93/2 |
| 2,540,707 | 2/1951 | Beukelman | 229/21 |
| 2,845,735 | 8/1958 | Werner | 41/10 |
| 3,028,070 | 4/1962 | Schnur et al. | 229/74 |
| 3,214,075 | 10/1965 | Champlin et al. | 229/16 |
| 3,271,922 | 9/1966 | Wallerstein et al. | 53/3 |

(List continued on next page.)

FOREIGN PATENT DOCUMENTS

| | | | |
|---|---|---|---|
| 782614 | 6/1935 | France | 47/41.01 |
| 1157678 | 6/1958 | France | 47/41.01 |
| 1255711 | 1/1961 | France | 47/41.01 |
| 4-126018 | 4/1992 | Japan | 47/41.01 |
| 5605 | 5/1885 | United Kingdom | 47/41.01 |
| 12250 | 5/1906 | United Kingdom | 47/72 |
| 1204647 | 9/1970 | United Kingdom | 47/72 |
| 1577949 | 10/1980 | United Kingdom | 206/423 |
| 2128083 | 4/1984 | United Kingdom | 47/72 |

Primary Examiner—Michael J. Carone
Assistant Examiner—Fredrick T. French, III
Attorney, Agent, or Firm—Dunlap, Codding & Rogers, P.C.

[57] ABSTRACT

A method for providing a decorative cover for a floral grouping wherein the decorative cover is provided with a design indicia bearing portion which extends above the remainder of the decorative cover and thereby enhances the visual aesthetic effect of the decorative cover. The decorative cover is formed from a sheet of material having a design indicia and an opening extending therethrough wherein the opening is offset from a central portion of the sheet of material in a direction generally away from the indicia bearing portion of the sheet of material. A lower portion of a stem end of a floral grouping is inserted through the opening in the sheet of material and the sheet of material is wrapped about the floral grouping to provide a decorative cover having a design indicia bearing portion which extends above the remainder of the decorative cover and thereby enhances the visual aesthetic effect of the decorative cover.

20 Claims, 1 Drawing Sheet

U.S. PATENT DOCUMENTS

| | | | |
|---|---|---|---|
| 3,376,666 | 4/1968 | Leonard | 47/41.01 |
| 3,508,372 | 4/1970 | Wallerstein et al. | 53/3 |
| 3,556,389 | 1/1971 | Gregoire | 229/53 |
| 3,657,840 | 4/1972 | Benoist | 47/41.01 |
| 3,748,781 | 7/1973 | Erling | 47/34.11 |
| 3,821,423 | 6/1974 | Jamin | 426/106 |
| 3,962,503 | 6/1976 | Crawford | 428/40 |
| 3,974,915 | 8/1976 | Mieuli, Jr. | 206/423 |
| 4,089,410 | 5/1978 | Bolanowski et al. | 206/63.3 |
| 4,091,925 | 5/1978 | Griffo et al. | 206/423 |
| 4,101,032 | 7/1978 | Obidniak | 206/457 |
| 4,108,350 | 8/1978 | Forbes, Jr. | 229/37 R |
| 4,171,085 | 10/1979 | Doty | 229/1.5 B |
| 4,297,811 | 11/1981 | Weder | 47/72 |
| 4,312,523 | 1/1982 | Haines | 283/18 |
| 4,333,267 | 6/1982 | Witte | 47/84 |
| 4,398,983 | 8/1983 | Suzuki et al. | 156/185 |
| 4,400,910 | 8/1983 | Koudstaal et al. | 47/84 |
| 4,546,875 | 10/1985 | Zweber | 206/82 |
| 4,713,839 | 12/1987 | Peppiatt | 383/29 |
| 4,801,014 | 1/1989 | Meadows | 206/423 |
| 4,989,396 | 2/1991 | Weder et al. | 53/399 |
| 5,007,229 | 4/1991 | Weder et al. | 53/397 |
| 5,007,578 | 4/1991 | Simone | 229/1.5 B |
| 5,079,900 | 1/1992 | Pinckney et al. | 53/413 |
| 5,105,599 | 4/1992 | Weder | 53/399 |
| 5,106,662 | 4/1992 | Khayat | 428/23 |
| 5,111,637 | 5/1992 | Weder et al. | 53/397 |
| 5,111,638 | 5/1992 | Weder | 53/397 |
| 5,145,062 | 9/1992 | Crispi | 206/233 |
| 5,161,348 | 11/1992 | Weder | 53/399 |
| 5,181,364 | 1/1993 | Weder | 53/397 |
| 5,205,108 | 4/1993 | Weder et al. | 53/397 |
| 5,228,234 | 7/1993 | KeKlerk et al. | 47/41.01 |
| 5,235,782 | 8/1993 | Landau | 47/72 |
| 5,242,052 | 9/1993 | Weder | 206/423 |
| 5,245,814 | 9/1993 | Weder | 53/397 |
| 5,293,715 | 3/1994 | Kaz | 47/72 |
| 5,307,605 | 5/1994 | Straeter | 53/397 |
| 5,311,991 | 5/1994 | Weder et al. | 206/423 |
| 5,315,785 | 5/1994 | Avot et al. | 47/72 |
| 5,353,575 | 10/1994 | Stepanek | 53/461 |
| 5,373,943 | 12/1994 | Weder et al. | 206/423 |
| 5,381,642 | 1/1995 | Weder et al. | 53/399 |
| 5,396,992 | 3/1995 | Weder | 206/423 |
| 5,408,803 | 4/1995 | Weder et al. | 53/399 |
| 5,428,939 | 7/1995 | Weder et al. | 53/397 |
| 5,443,670 | 8/1995 | Landau | 156/191 |
| 5,467,573 | 11/1995 | Weder et al. | 53/397 |
| 5,501,060 | 3/1996 | Weder et al. | 53/399 |
| 5,522,202 | 6/1996 | Weder et al. | 53/397 |
| 5,544,469 | 8/1996 | Weder et al. | 53/410 |
| 5,557,882 | 9/1996 | Weder | 47/44.01 |
| 5,572,826 | 11/1996 | Weder | 47/41.12 |
| 5,595,048 | 1/1997 | Weder et al. | 53/399 |
| 5,687,502 | 11/1997 | Weder | 47/41.01 |
| 5,715,649 | 2/1998 | Weder et al. | 53/397 |
| 5,720,150 | 2/1998 | Weder et al. | 53/397 |
| 5,758,452 | 6/1998 | Matteucci et al. | 47/41.01 |
| 5,784,859 | 7/1998 | Weder et al. | 53/397 |
| 5,816,020 | 10/1998 | Weder | 53/397 |

U.S. Patent  Nov. 28, 2000  6,151,829
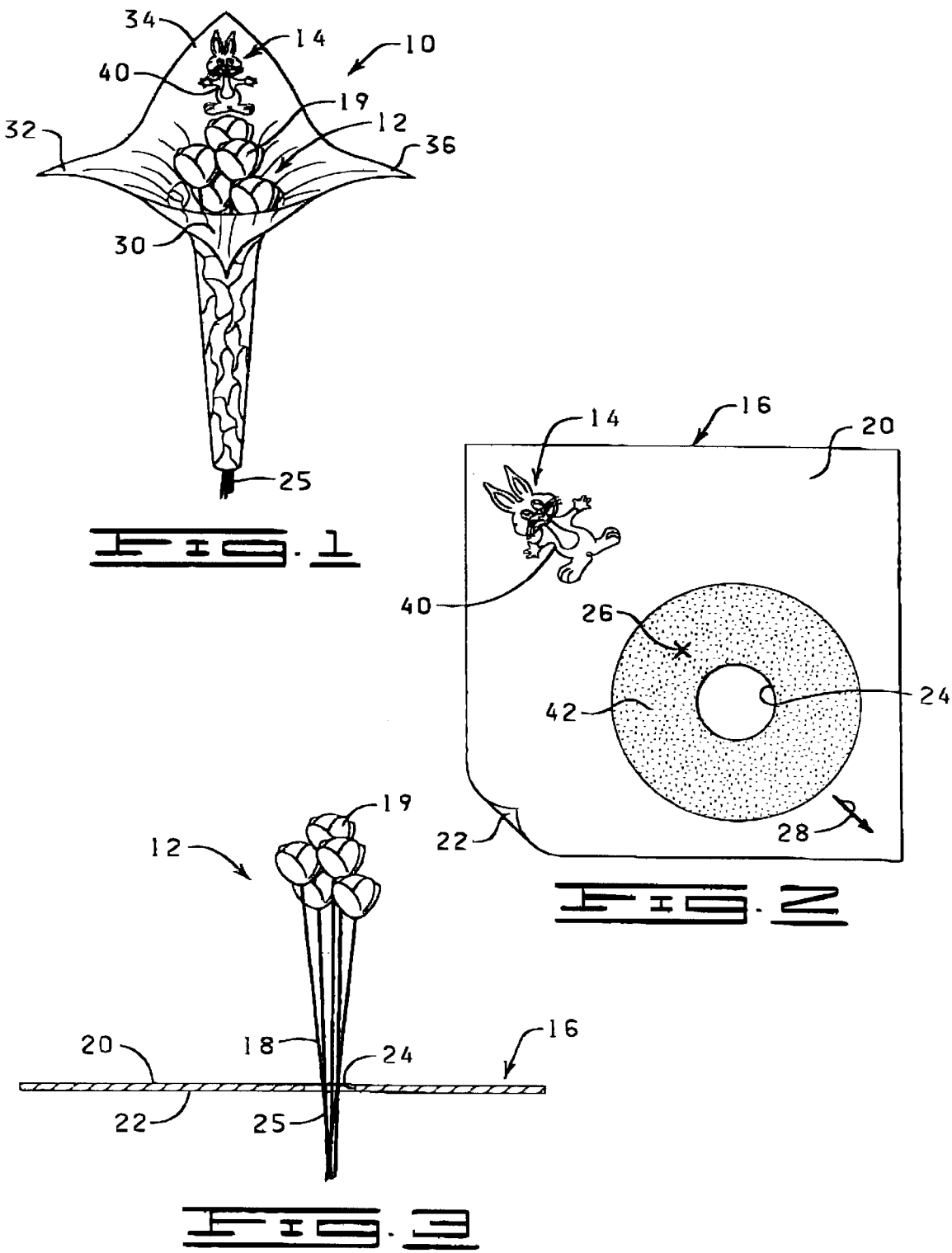

METHOD FOR PROVIDING A DECORATIVE COVER FOR A FLORAL GROUPING

CROSS-REFERENCE TO RELATED APPLICATIONS

This application is a continuation of U.S. Ser. No. 09/408, 599, filed Sep. 30, 1999 now U.S. Pat. No. 6,055,772, which is a continuation of U.S. Ser. No. 09/295,715, filed Apr. 21, 1999 now U.S. Pat. No. 6,029,400, which is a continuation of U.S. Ser. No. 09/050,437, filed Mar. 30, 1998.

BACKGROUND OF THE INVENTION

Field of the Invention

The present invention relates to a decorative cover for a floral grouping, and more particularly but not by way of limitation, to a decorative cover for a floral grouping and to a method for producing such decorative cover wherein the decorative cover contains design indicia to personalize or enhance the visual aesthetic effect of the decorative cover.

BRIEF SUMMARY OF THE INVENTION

The present invention relates generally to a decorative cover for a floral grouping wherein the decorative cover has design indicia for enhancing the visual effect of the decorative cover and to a method for producing such decorative cover. In one aspect, the decorative cover has an indicia bearing portion which extends a distance above the remainder of the decorative cover so as to enhance the visual aesthetic effect of decorative cover. In yet another aspect, the present invention relates to a method for producing a decorative cover for a floral grouping wherein the decorative cover is provided with a design indicia and wherein the method for producing the decorative cover includes the steps of: (a) providing a sheet of material having a design indicia bearing portion and an opening adapted to receive a lower portion of a stem end of a floral grouping, the opening being offset from a central portion of the sheet of material in a direction generally away from the indicia bearing portion of the sheet of material; (b) disposing a lower portion of a stem end of a floral grouping in the opening in the sheet of material; and (c) forming the sheet of material into a decorative cover about the floral grouping such that the indicia bearing portion of the decorative cover extends above the remainder of the decorative cover and thereby enhances the visual aesthetic effect of decorative cover.

An object of the present invention is to provide a decorative cover for a floral grouping wherein the decorative cover is provided with an indicia bearing portion for enhancing the visual aesthetic effect of the decorative cover.

Another object of the present invention, while achieving the before stated object, is to provide a method of producing a decorative cover for a floral grouping wherein the decorative cover is provided with an indicia bearing portion for enhancing the visual aesthetic effect of the decorative cover.

Other objects, features and advantages of the present invention will be apparent to those skilled in the art from the following detailed description when read in conjunction with the accompanying drawings and appended claims.

BRIEF DESCRIPTION OF THE SEVERAL VIEWS OF THE DRAWING

FIG. 1 is a perspective view of a decorative cover formed about a floral grouping in accordance with the present invention, the decorative cover having an indicia bearing portion which enhances the visual aesthetic effect of the decorative cover.

FIG. 2 is a top plan view of a sheet of material having a substantially square-shaped configuration used in the construction of the decorative cover of FIG. 1, the sheet of material having a portion upturned to show a lower side of the sheet of material and the sheet of material having a design indicia bearing portion and an opening adapted to receive a lower portion of a stem end of a floral grouping, the opening being offset from a central portion of the sheet of material in a direction generally away from the indicia bearing portion of the sheet of material.

FIG. 3 is a side elevational view, partially in cross section, of a floral grouping having a lower portion of a stem end thereof inserted through an opening in a sheet of material.

DETAILED DESCRIPTION OF THE INVENTION

Definitions

The term "floral grouping" as used herein refers to a single flower, foliage, botanical item, propagule, cut flowers, artificial flowers, and/or other fresh and/or artificial plants or floral materials, including secondary plants and/or other ornamentation which adds to the aesthetic qualities of the overall floral grouping.

The term "bonding material" as used herein refers to any, adhesive or cohesive including pressure sensitive adhesives and co-adhesives. The term "bonding material" as used herein also refers to materials which are heat sealable, sonic sealable, and/or vibratory sealable. For example, the term "bonding material" can refer to a heat. sealing lacquer which may be applied to a sheet of material and effectively bonded thereto by heat, sound waves, or vibrations.

The term "bonding material" as used herein also refers to any type of material or device which can be used to effect the bonding or connecting of two adjacent portions of a sheet of material to effect the connection or bonding described herein. Thus, the term "bonding material" can refer to ties, labels, elastomeric bands, ribbons, strings, tape, staples, and combinations thereof.

The term "bonding material" as used herein also refers to any heat or chemically shrinkable material, electrical bonding means such as static electricity, magnetic bonding means, mechanical or barb-type fastening means, clamping means, curl-type characteristics of a film means, materials incorporated into the sheet of material which can cause the sheet of material to take on certain shapes, and any type of welding methods which may weld portions of the sheet to itself and/or other sheets.

The term "polymer film" as used herein refers to a film formed of synthetic polymers such as polypropylene or naturally occurring polymers such as cellophane, which are relatively strong and not subject to tearing (substantially non-tearable). Various types of "polymer films" are described in U.S. Pat. No. 5,311,991, issued to Weder et al. on May 17, 1994, which is hereby incorporated herein by reference.

The term "cling wrap" as used herein refers to any material which is capable of connecting to itself when wrapped about an item, such as a floral grouping. The term "cling wrap" is defined in detail in U.S. Pat. No. 5,311,991 issued to Weder et al. on May 17, 1994, which is expressly incorporated herein by reference.

The term "design indicia" as used herein refers to fanciful designs such as hearts, balloons, pumpkins, clover, eggs, tombstones, flowers (such as roses, daisies, lilacs and the like), plants (such as fruits, vegetables, clover, grasses, trees and the like), mammals (such as rabbits, dogs, cats and the like), fictional characters (such as cartoon characters), non-mammals (such as chicks, birds, alligators and the like), or real characters (such as a photograph of an individual), and the like.

Design indicia as used herein also refers to printed information, including letters, numbers, words and/or slogans for special occasions (such as a birthday, an anniversary, a holiday such as valentine's day, Mother's day, Easter, Christmas and the like), as well as combinations of various fanciful designs and/or printed information.

DESCRIPTION OF VARIOUS EMBODIMENTS

Referring now to the drawings, and more particularly to FIG. 1, shown therein is a decorative cover 10 disposed about a floral grouping 12. The decorative cover 10 is provided with an indicia bearing portion 14 which extends above the remainder of the decorative cover 10 and the floral grouping 12 substantially as shown so as to enhance the visual aesthetic. effect of the decorative cover 10. The decorative cover 10 is formed by wrapping at least one sheet of material 16 (FIGS. 2 and 3) about a stem end 18 of the floral grouping 12 such that a bloom end 19 of the floral grouping 12 is visible. The decorative cover 10 is then secured about the floral grouping via a suitable bonding material, such as an adhesive, a band, a ribbon and the like.

As more clearly shown in FIGS. 2 and 3, the sheet of material 16 has, in addition to the design indicia bearing portion 14, an upper surface 20, a lower surface 22, and an opening 24 adapted to receive at least a lower portion 25 of the stem end 18 of the floral grouping 12. The opening 24 in the sheet of material 16 is offset from a central portion 26 of the sheet of material 16 in a direction 28 generally away from the indicia bearing portion 14 of the sheet of material 16.

The sheet of material 16, which has a substantially square-shaped configuration, is sized so that when the lower portion 25 of the stem end 18 of the floral grouping 12 is disposed through the opening 24 in the sheet of material 16 and the sheet of material 16 is wrapped or formed about the floral grouping 12, the decorative cover 10 so formed is provided with four petal-like portions 30, 32, 34 and 36, each of which terminates with a substantially pointed end formed by the four corners of the substantially square-shaped sheet of material 16. Three of the petal-like portion 30, 32 and 36 are flared so as to extend a distance upwardly and outwardly from the floral grouping 12, and the petal-like portion 34, which is formed of the design indicia bearing portion 14 of the sheet of material 16, extends in an upwardly direction from the floral grouping 12 substantially as shown and contains a design indicia 40 which enhances the visual aesthetic effect of the decorative cover 10.

A bonding material can be applied to at least a portion of the upper and/or lower surfaces 20 and 22 of the sheet of material 16 surrounding the opening 24 in the sheet of material 16, such as the adhesive or cohesive 42 applied to a portion of the upper surface 20 of the sheet of material 16.

The design indicia 40 may be produced on the sheet of material 16 by application of a dye, ink, and/or pigment to the sheet of material 16 such that, upon forming the sheet of material 16 about the floral grouping 12 to produce the decorative cover 10, the decorative cover 10 is provided with the design indicia bearing portion 14. Such dyes, inks, and/or pigments are known in the art and are commercially available, and may be applied to the sheet of material 16 by any method known in the art. In addition, the design indicia 40 may be a hologram and/or an outlined configuration, or a hologram and/or outlined configuration in combination with a printed portion, or an embossed pattern, a printed pattern, or an embossed and printed pattern wherein the embossed pattern and printed pattern may be either in register, out of register or wherein a portion of the embossed pattern is in register with a portion of the printed pattern and a portion of the embossed pattern is out of register with a portion of the printed pattern.

Referring more specifically to FIG. 3, the decorative cover 10 shown in FIG. 1 is formed about the floral grouping 12 by inserting the lower portion 25 of the stem end 18 of the floral grouping 12 through the opening 24 in the sheet of material 16 such that the lower portion 25 of the stem end 18 of the floral grouping 12 extends a distance below the lower surface 22 of the sheet of material 16. The sheet of material 16 is then wrapped about the floral grouping 12 while the lower portion 25 of the stem end remains extended through the opening substantially as shown. The sheet of material 16 can be wrapped about the floral grouping 12 such that the decorative cover 10 substantially encompasses the bloom end 19 of the floral grouping 12; or the sheet of material 16 can be wrapped about the floral grouping 12 so that the bloom end 19 of the floral grouping extends upwardly beyond the accentuated flared petal-like portions 30, 32 and 36.

The sheet of material 16 is tightly wrapped about the stem end 18 of the floral grouping 12 and at least a portion. of the overlapping portions of the decorative cover 10 are boridingly connected by the adhesive or cohesive 42 applied to a portion of the upper surface 20 of the sheet of material 16 to secure the decorative cover 10 tightly about the stem end 18 of the floral grouping 12 and thereby substantially prevent the floral grouping 12 from sliding or moving within the decorative cover 10.

As previously stated, when the lower portion 25 of the stem end 18 of the floral grouping 12 is disposed through the opening 24 in the sheet of material 16 and the sheet of material 16 is wrapped about the floral grouping 12, the decorative cover 10 so formed is provided with the four petal-like portions 30, 32, 34 and 36, each of which terminates with a substantially pointed end formed. by the four corners of the substantially square-shaped sheet of material 16. Three of the petal-like portion 30, 32 and 36 are flared and extend a distance upwardly and outwardly from the floral grouping 12, while the petal-like portion 34, which is formed of the design indicia bearing portion 14 of the sheet of material 16, extends in an upward direction from the floral grouping 12 substantially as shown and contains a design indicia 40 which enhances the visual aesthetic effect of the decorative cover 10. Thus, a portion of the decorative cover 10 is tightly wrapped about the stem end 18 of the floral grouping 12 while another portion of the decorative cover 10 is loosely formed about the bloom end 19 of the floral grouping 12.

The sheet of material 16 employed in the construction of the decorative cover 10 has a substantially planar cross-section and a thickness in a range of from about 0.1 mil to about 30 mils, more desirably from about 1 mil to about 10 mils. However, it should be understood that the thickness of the sheet of material 16 may vary depending on the type of material from which the sheet of material 16 is constructed. That is, it should be understood that the sheet of material 16 can have any thickness so long as the sheet of material 16 retains sufficient flexibility and foldability so that the sheet of material 16 can be formed about the floral grouping 12 to provide the decorative cover 10 thereabout. For example, the sheet of material 16 can be constructed of paper, metal foil, natural polymer films, synthetic polymer films, cling wrap, cloth, burlap and/or combinations thereof.

A decorative pattern, such as a color and/or an embossed pattern and/or a hologram and/or other decorative surface ornamentation may be applied to the upper and/or lower surfaces 20 and 22 of the sheet of material 16 or portions thereof, including but not limited to, printed designs, embossed designs, coatings, colors, flocking or metallic finishes. Further, the sheet of material 16, with the exception of the design indicia 40, may be totally clear or partially clear or a tinted transparent material.

Although the sheet of material 16 has been shown and described herein as having a substantially square-shaped configuration, it should be understood that the sheet of material 16 may assume any geometric, non-geometric, asymmetrical or fanciful shape having any appropriate size so long as the sheet of material 16 can be disposed about the floral grouping 12 to form the decorative cover 10 thereabout. For example, the sheet of material 16 may be rectangular in shape, circular in shape, heart-shaped or the like.

While the decorative cover 10 has been described as being formed of one sheet of material 16, it is to be understood that the decorative cover 10 can be formed of two or more sheets of material 16. In addition, when employing two or more sheets of material 16 to form the decorative cover 10 about the floral grouping 12, the configuration of the sheets of material 16 may vary depending upon the overall design desired for the decorative cover 10. For example, when using two sheets of material 16 to form the decorative cover 10, the sheets of material 16 can have the same configuration, such as a square-shaped configuration, or the two sheets of material 16 can have different configurations, such as a square-shaped configuration and a rectangular-shaped configuration, and if desired, the two sheets of material 16 can be oriented differently relative to one another.

While certain embodiments of a decorative flower pot cover and a decorative cover for a floral grouping have been described in detail herein, it should be understood that changes may be made in the construction and operation of the various components and assemblies described herein and changes may be made in the steps or the sequence of steps of the methods described herein without departing from the spirit and the scope of the invention as defined in the following claims.

What is claimed is:

1. A method for providing a decorative cover for a floral grouping having a bloom end and a stem end, comprising:

providing a sheet of material having a design indicia on at least one side thereof and an opening extending therethrough, the opening being offset from a central portion of the sheet of material in a direction generally away from the indicia bearing portion of the sheet of material;

disposing at least a portion of the stem end of the floral grouping through the opening in the sheet of material; and wrapping the sheet of material about the floral grouping to provide a decorative cover about the floral grouping wherein the design indicia of the sheet of material is visible in conjunction with the bloom end of the floral grouping.

2. The method for providing a decorative cover for a floral grouping of claim 1 wherein the sheet of material is provided with a substantially square-shaped configuration having four corners and wherein the decorative cover comprises four petal-like portions formed by the corners of the sheet of material, three of the petal-like portions being flared so as to extend a distance upwardly and outwardly from the floral grouping when the sheet of material is wrapped about the floral grouping, the fourth petal-like portion containing the design indicia of the sheet of material and extending substantially in an upwardly direction so as to extend above the flared petal-like portions of the decorative cover when the sheet of material is wrapped about the floral grouping.

3. The method for providing a decorative cover for a floral grouping of claim 2 wherein the sheet of material is wrapped about the floral grouping so as to overlap portions of the sheet of material, and wherein the sheet of material is provided with a bonding material disposed on at least a portion of the sheet of material such that upon wrapping the sheet of material about the floral grouping to provide the decorative cover, at least a portion of the overlapping portions of the decorative cover are bonded via the bonding material.

4. The method for providing a decorative cover for a floral grouping of claim 3 wherein the sheet of material is further defined as being a substantially flat, flexible sheet of material.

5. The method for providing a decorative cover for a floral grouping of claim 4 wherein the sheet of material is constructed of a material selected from the group consisting of paper, metal, foil, natural polymer films, synthetic polymer films, cling wrap, cloth, burlap and/or combinations thereof.

6. The method for providing a decorative cover for a floral grouping of claim 5 wherein the sheet of material has a thickness in a range of from about 0.1 mil to about 30 mils.

7. The method for providing a decorative cover for a floral grouping of claim 1 wherein the sheet of material is wrapped about the floral grouping so as to overlap portions of the sheet of material, and wherein the sheet of material is provided with a bonding material disposed on at least a portion of the sheet of material such that upon wrapping the sheet of material about the floral grouping to provide the decorative cover, at least a portion of the overlapping portions of the decorative cover are bonded via the bonding material.

8. The method for providing a decorative cover for a floral grouping of claim 1 wherein the sheet of material is further defined as being a substantially flat, flexible sheet of material.

9. The method for providing a decorative cover for a floral grouping of claim 1 wherein the sheet of material is constructed of a material selected from the group consisting of paper, metal foil, natural polymer films, synthetic polymer films, cling wrap, cloth, burlap and/or combinations thereof.

10. The method for providing a decorative cover for a floral grouping of claim 1 wherein the sheet of material has a thickness in a range of from about 0.1 mil to about 30 mils.

11. A method for providing a decorative cover for a floral grouping having a bloom end and a stem end, comprising:

providing a sheet of material having a design indicia on at least one side thereof and an opening extending therethrough, the opening being offset from a central portion of the sheet of material disposing at least a portion of the stem end of the floral grouping through the opening in the sheet of material; and wrapping the sheet of material about the floral grouping to provide a decorative cover about the floral grouping wherein the design indicia of the sheet of material is visible in conjunction with the bloom end of the floral grouping.

12. The method for providing a decorative cover for a floral grouping of claim 11 wherein the sheet of material is wrapped about the floral grouping so as to overlap portions of the sheet of material, and wherein the sheet of material is provided with a substantially square-shaped configuration having four corners and wherein the decorative cover comprises four petal-like portions formed by the corners of the sheet of material, three of the petal-like portions being flared so as to extend a distance upwardly and outwardly from the floral grouping when the sheet of material is wrapped about the floral grouping, the fourth petal-like portion extending upwardly so as to extend above the flared petal-like portions of the decorative cover when the sheet of material is wrapped about the floral grouping.

13. The method for providing a decorative cover for a floral grouping of claim 12 wherein the sheet of material is provided with a bonding material disposed on at least a portion of the sheet of material such that upon wrapping the sheet of material about the floral grouping to provide the decorative cover, at least a portion of the overlapping portions of the decorative cover are bonded via the bonding material.

14. The method for providing a decorative cover for a floral grouping of claim 13 wherein the sheet of material is further defined as being a substantially flat, flexible sheet of material.

15. The method for providing a decorative cover for a floral grouping of claim 14 wherein the sheet of material is constructed of a material selected from the group consisting of paper, metal foil, natural polymer films, synthetic polymer films, cling wrap, cloth, burlap and/or combinations thereof.

16. The method for providing a decorative cover for a floral grouping of claim 15 wherein the sheet of material has a thickness in a range of from about 0.1 mil to about 30 mils.

17. The method for providing a decorative cover for a floral grouping of claim 11 wherein the sheet of material is wrapped about the floral grouping so as to overlap portions of the sheet of material, and wherein the sheet of material is provided with a bonding material disposed on at least a portion of the sheet of material such that upon wrapping the sheet of material about the floral grouping to provide the decorative cover, at least a portion of the overlapping portions of the decorative cover are bonded via the bonding material.

18. The method for providing a decorative cover for a floral grouping of claim 11 wherein the sheet of material is further defined as being a substantially flat, flexible sheet of material.

19. The method for providing a decorative cover for a floral grouping of claim 11 wherein the sheet of material is constructed of a material selected from the group consisting of paper, metal foil, natural polymer films, synthetic polymer films, cling wrap, cloth, burlap and/or combinations thereof.

20. The method for providing a decorative cover for a floral grouping of claim 11 wherein the sheet of material has a thickness in a range of from about 0.1 mil to about 30 mils.

* * * * *

UNITED STATES PATENT AND TRADEMARK OFFICE
CERTIFICATE OF CORRECTION

PATENT NO.    : 6,151,829
DATED         : November 28, 2000
INVENTOR(S)   : Donald E. Weder Page 1 of 1

It is certified that error appears in the above-identified patent and that said Letters Patent is hereby corrected as shown below:

Column 1,
Line 29 and 46, after "of" insert -- the --.

Column 3,
Line 9, delete "valentine's" and substitute therefor -- Valentine's --".
Line 20, after "aesthetic", delete ".".
Line 46, delete "portion" and substitute therefor -- portions --.

Column 4,
Line 28, after "portion", delete ".".
Lines 29 and 30, delete "boridly" and substitute therefor -- bondingly --.
Line 42, after "formed", delete ".".
Line 44, delete "portion" and substitute therefor -- portions --.

Column 6,
Line 59, after "material" insert -- ; --.

Signed and Sealed this

Twelfth Day of March, 2002

Attest:

Attesting Officer

JAMES E. ROGAN
Director of the United States Patent and Trademark Office